United States Patent [19]

Wolf

[11] Patent Number: 4,856,265
[45] Date of Patent: Aug. 15, 1989

[54] CUTTING HEAD WITH SYNCHRONIZED COUNTER-ROTARY BLADES

[75] Inventor: Pierre Wolf, Wissembourg, France

[73] Assignee: Etesia, Wissembourg, France

[21] Appl. No.: 78,161

[22] Filed: Jul. 27, 1987

[30] Foreign Application Priority Data

Jul. 25, 1986 [FR] France .................................. 86 11159

[51] Int. Cl.[4] ........................ A01D 34/66; A01D 34/70
[52] U.S. Cl. ........................................ 56/320.2; 56/6; 56/202
[58] Field of Search .................... 56/6, 13.4, 13.6, 202, 56/255, 320.1, 320.2, 16.6

[56] References Cited

U.S. PATENT DOCUMENTS

| | | | |
|---|---|---|---|
| 2,071,872 | 2/1937 | Hamilton | 56/25 |
| 2,926,478 | 3/1960 | Jepson | 56/320.2 |
| 3,186,152 | 6/1965 | Epstein | 56/202 |
| 4,064,680 | 12/1977 | Fleigle | 56/13.6 |
| 4,326,370 | 4/1982 | Thorud | 56/202 |
| 4,335,567 | 6/1982 | Comer | 56/13.4 |
| 4,424,661 | 1/1984 | Kulak | 56/320.2 |
| 4,711,077 | 12/1987 | Kutsake et al. | 56/255 |
| 4,720,964 | 1/1988 | Ermacora et al. | 56/13.6 |

FOREIGN PATENT DOCUMENTS

976056 11/1964 United Kingdom ................. 56/13.4

*Primary Examiner*—John Weiss
*Attorney, Agent, or Firm*—Young & Thompson

[57] ABSTRACT

The present invention concerns a cutting head with synchronized counter-rotating blades and is characterized in that the ejection channel (4) progressively widens from the point of intersection (7) of the blades, by variation of the curvature of the interior surface (6') of the skirt enveloping the space (5) above each blade, up to the ejection opening.

4 Claims, 2 Drawing Sheets

CUTTING HEAD WITH SYNCHRONIZED COUNTER-ROTARY BLADES

The present invention concerns the field of construction of lawnmowers, particularly those having a wide cutting swath, and has as an object a cutting head with synchronized counter-rotary blades.

At present, lawnmowers having a wide cutting swath are generally provided either with a single oversized blade or several overlapping blades turning in the same direction.

However, in the case of a single oversized blade, this latter is dangerous for the user because of the substantial kinetic energy imparted thereto.

The known multiple blade mowers, which may be mowers with juxtaposed cutting paths or mowers with overlapping cutting paths, do not generally permit direct gathering, without auxiliary means, of the cut grass.

Moreover, in the mowers having juxtaposed cutting paths, the blades each independently sweep a circular area the diameter of which is equal to that of the cutting blade. The distance between the axes of these blades is always greater than the diameter of the circle described by the ends of the blades, in the case of identical blades. In order to effect a uniform mowing over all the swath of mowers thus equipped, the cutting area of each blade is offset relative to the adjacent blades in an alternating manner, such that advancing of the mower causes more or less narrow overlapping bands. These overlapping bands are consecutively mowed by two adjacent blades, offset relative to each other laterally and longitudinally.

Finally, in these known lawnmowers, the blades are identical and all turn in the same direction, without effecting a gathering of the cut grass.

The mowers with overlapping cutting paths have a common cutting area for two adjacent blades, and the rotation of the blades is synchronized such that the common area is mowed alternately by one or the other of the two blades in question. These known mowers are generally equipped with identical blades turning in the same direction of rotation, and ejection of the cut grass is effected laterally or rearwardly, without simultaneous gathering.

In another known lawnmower of this type (U.S.-A-2,071,872) gathering of the cut grass is effected directly. Nevertheless, the cutting blades mow areas which are more or less adjacent, which causes a noticeably irregular mowing in that a trail of uncut grass is produced by the space existing between the cutting areas of the two adjacent blades.

There is also known, from U.S.-A-4,335,562, a wire mower, in which two discs provided with cutting wires are driven in a counter-rotating manner, and the trajectories of the cutting wires intersect in the central portion. This embodiment nevertheless does not permit a good cutting, and an efficient evacuation of medium or tall grass.

On the other hand, GB-A-976,056 describes a cutting head having two synchronized counter-rotating blades permitting central ejection of the cut grass. Nevertheless, the internal configuration of this cutting head, as well as its ejection channel, do not permit efficient evacuation of the cut grass, particularly in the case of medium or tall grass.

The present invention has as an object to overcome these disadvantages.

Specifically, it has as an object a cutting head with synchronized counter-rotating blades, provided essentially with two vertical shafts, each carrying a cutting blade and turning in opposite directions, the blades describing trajectories which intersect, their angular offset being constant and substantially equal to 90°, and the rotation of their shafts being synchronized, the housing of the cutting head comprising a skirt that envelopes the trajectories described by the ends of the blades about the overall exterior perimeter, and guiding the airflow caused by rotation of each blade to the point of intersection of the trajectories of the blades, from which an ejection channel extends upwardly in the direction of the tangent common to the trajectories of the two blades, characterized in that the ejection channel progressively widens in horizontal section from the point of intersection of the blade trajectories, by a variation of the curvature of the interior wall of the skirt enclosing the space above each blade, up to the ejection opening.

The invention will be best understood thanks to the following description, which relates to a preferred embodiment, given by way of non-limiting example and explained with reference to the accompanying schematic drawing, in which.

Figure 1:
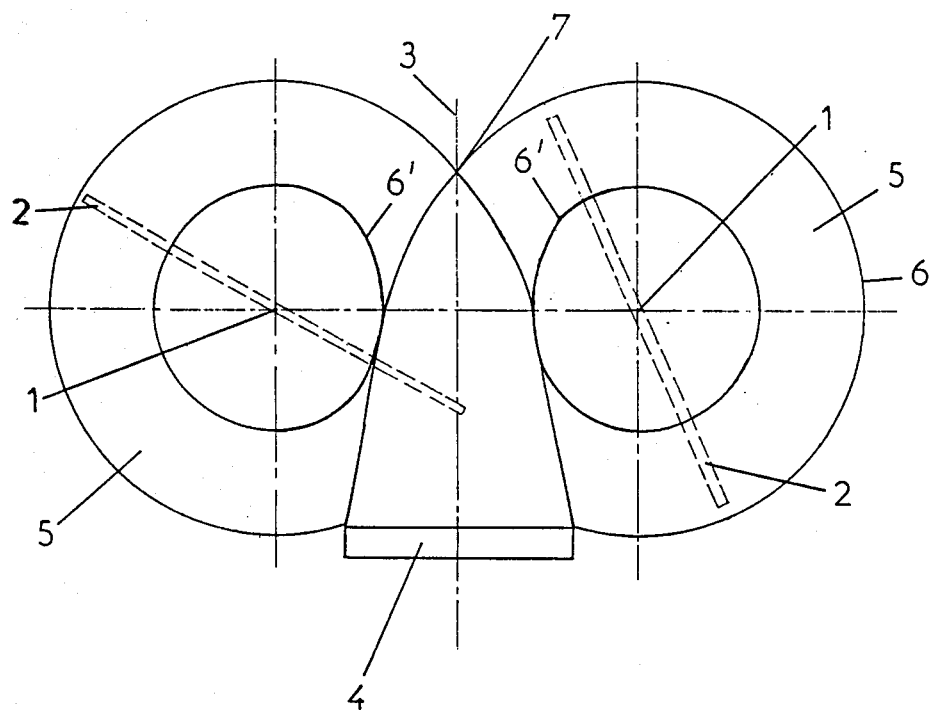
FIG. 1 is a plan view of the cutting head according to the invention.
Figure 2:
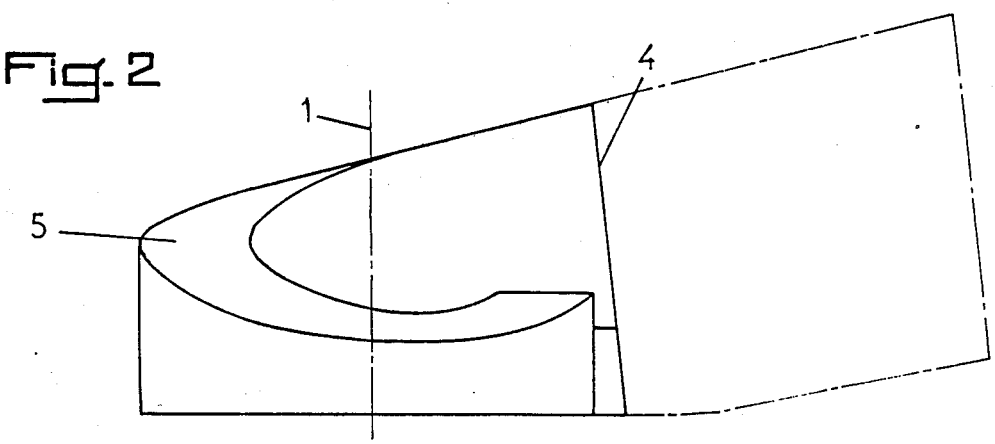
FIG. 2 is a side view of the head according to FIG. 1.

According to the invention, and as is shown more particularly by way of example in FIG. 1 of the accompanying drawings, the cutting head with counter-rotating blades, having two vertical shafts 1 which each carry a cutting blade 2 and which turn in opposite directions, the blades describing trajectories which intersect, their angular displacement being constant and substantially equal to 90° and the rotation of the shafts being synchronized, the cutting head further comprises a skirt 6 that encloses the trajectories described by the ends of the blades 2 over all of the exterior perimeter, and which directs the airflow caused by the rotation of each blade 2 up to the point of intersection 7 of the trajectories of the blades, which from an ejection channel 4 extends upwardly in the direction of the tangent 3 common to the trajectories of the two blades, is characterized in that the ejection channel 4 progressively widens, or spirals, from the point of intersection 7 of the blades 2 by variation of the curvature of the interior wall 6' of the skirt enclosing the space 5, above each blade, up to the ejection opening.

The interior wall 6' of the skirt enveloping each space or volute 5, has, in horizontal section, a circular exterior portion and an oval interior portion.

According to another characteristic of the invention, the interior oval portion of the interior surface 6' of the skirt has a minor axis perpendicular to the advancing direction and to the tangent 3 common to the trajectories of the blades 2, its major axis being the same as that of the circular portion of the all 6' and parallel to the said tangent 3 (FIG. 1). In other words, the minor axis is perpendicular to the direction of mowing and the major axis is parallel to that direction and intersects the axis of rotation of the associated blade.

The reduction of the radius of the minor axis relative to the major axis is advantageously about equal to the extent to which the blades 2 overlap, that is, these two radii differ by about that amount. This ovalization of the wall 6' permits, by reduction of the radius of the said wall starting from the intersection point 7 of the trajectories of the blades 2, a regular and continuous increase of the section of the ejection channel 4, such that the grass cut by the blades 2 and conducted through the volutes 5 progresses into a channel whose section is always expanding, and thus is not subject to jamming.

Figure 3:
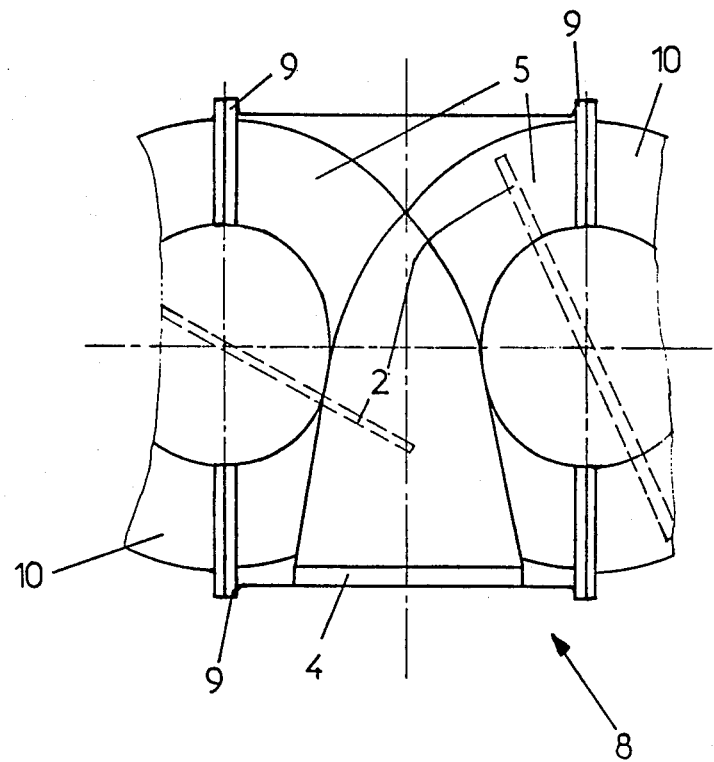
FIG. 3 is a plan view of a variation according to the invention.

FIG. 3 shows a variation according to the invention, in which the cutting head is in the form of a modular housing constituted by a central portion 8 enclosing the ejection channel 4 and the portions of volutes 5 comprised between the shafts of the blades 2, and having, at the level of the said volutes 5, lateral flanges 9, and semi-volutes 10 (shown partially in the drawing) fixed to the flanges 9 of the central portion 8 by screwing or by bolting. This embodiment permits simple removal and replacement of the semi-volutes 10, which are in the area exposed to impact, especially lateral impact, and thus are subject to deterioration, without having to replace the entire cutting head.

According to another characteristic of the invention, the central portion 8 and the semi-volutes 10 are advantageously formed from different materials, namely, the semi-volutes 10 from a material resistant to impact, and the central portion 8 from a material of lesser resistance.

Thus, by way of example, the central portion 8 may be constituted from a rigid synthetic material and may be injection- or pressure-molded, and the semi-volutes 10 may be formed from molded aluminum, or also from sheet iron.

Finally, according to another characteristic of the invention, the semi-volutes 10 are advantageously identical and symmetrical about their transverse axis. This embodiment permits the semi-volutes 10 to be interchanged from one side of the central portion 8 to the other simply by screwing or bolting onto the flanges 9.

The provision of a cutting head in the form of a modular housing moreover permits, if desired, transformation of the said head in order to widen its cutting swath, by mounting on each side of the central portion 8 a head element comprising one or several additional blades.

Thanks to the invention, it is possible to realize a cutting head permitting good evacuation of the cut grass regardless of the cutting conditions, one element of which may be individually replaced, as the case may be.

It will be understood that the invention is not limited to the embodiments described and shown in the accompanying drawings. Modifications remain possible, particularly from the point of view of the constitution of the various elements, or by substitution of equivalent techniques, without departing whatsoever from the scope of protection of the invention.

What is claimed is:

1. A cutting head with synchronized counter-rotating blades, comprising to rotatable vertical shafts (1) each carrying a cutting blade (2) and turning in opposite directions, the blades (2) describing trajectories that intersect at a point (7) forward of said shafts, the blades having an anular displacement relative to each other that is constant, the rotation of said shafts (1) being synchronized, a housing for the cutting head that directs the airflow caused by rotation of each blade (2) to said intersection point (7) of the trajectories of the blades (2), an ejection channel (4) extending upwardly and rearwardly between said shafts (1), the housing having radially inner (6') and outer (6) arcuate walls about each shaft (1) covering and laterally bounding arcuate spaces (5) above each blade, said spaces (5) merging into a space common to both blades (2) that progressively widens in horizontal section rearwardly from said point of intersection (7) of the trajectors of the blades, said radially outer walls (6) of the housing comprising a pair of intersecting circular skirts that terminate downwardly in free circular edges that are the lowermost edges of the housing, each said skirt enclosing the trajectory described by the end of one said blade (2), said radially inner walls (6') of the housing having portions that border and confine a portion of said space common to both blades (2) and that are oval with a major axis intersecting the axis of rotation of the associated blade (2) and extending forwardly and rearwardly and a minor axis also intersecting the axis of rotation of the associated blade (2) but extending perpendicular to said major axis, said major axes being parallel to each other and said minor axes being coincident, said oval portions extending forwardly of said minor axes at least a distance such that when said blades occupy said point of intersection said blades directly underlie said oval portions.

2. A cutting head as claimed in claim 1, in which said housing is modular and is constituted by a central portion (8) enclosing the ejection channel (4) and end portions (10) on opposite sides of said central portion (8), said central and end portions being interconnected by flanges (9) that meet in vertical planes each of which contains a said major axis.

3. A cutting head as claimed in claim 2, in which said end portions (10) are of an impact-resistant material and said central portion (8) is of a material of lesser impact resistance.

4. A cutting head as claimed in claim 2, in which said end portions (10) are identical and are symmetrical about a vertical plane that includes said minor axes.

* * * * *